US008656027B2

(12) United States Patent
Koga

(10) Patent No.: US 8,656,027 B2
(45) Date of Patent: Feb. 18, 2014

(54) WIRELESS COMMUNICATION SYSTEM, WIRELESS COMMUNICATION APPARATUS, METHOD FOR DISCONNECTION PROCESS THEREOF, AND STORAGE MEDIUM

(75) Inventor: Kifumi Koga, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 333 days.

(21) Appl. No.: 12/392,519

(22) Filed: Feb. 25, 2009

(65) Prior Publication Data
US 2009/0300188 A1    Dec. 3, 2009

(30) Foreign Application Priority Data

May 30, 2008    (JP) .................................. 2008-143890

(51) Int. Cl.
*G06F 15/16*    (2006.01)
(52) U.S. Cl.
USPC ......... 709/227; 709/229; 370/216; 370/395.2
(58) Field of Classification Search
USPC ................ 709/227–229; 370/311, 216, 395.2
See application file for complete search history.

(56) References Cited

U.S. PATENT DOCUMENTS

| | | | | |
|---|---|---|---|---|
| 5,566,171 A * | 10/1996 | Levinson | ...................... | 370/352 |
| 5,732,347 A | 3/1998 | Bartle et al. | | |
| 6,985,979 B2 * | 1/2006 | Kagawa et al. | ................ | 710/100 |
| 7,051,104 B1 * | 5/2006 | Cheng | ........................... | 709/227 |
| 7,420,940 B2 | 9/2008 | Fukui | | |
| 7,818,460 B2 * | 10/2010 | Kim et al. | ..................... | 709/250 |
| 7,904,087 B2 * | 3/2011 | Zhang et al. | .................. | 455/437 |
| 7,904,094 B2 * | 3/2011 | Howell et al. | ................. | 455/455 |
| 8,139,623 B2 | 3/2012 | Nielsen et al. | | |
| 2002/0002584 A1 * | 1/2002 | Takagi et al. | .................. | 709/204 |
| 2003/0152030 A1 * | 8/2003 | Hershey | ......................... | 370/236 |
| 2004/0098487 A1 * | 5/2004 | Miller et al. | ................... | 709/228 |
| 2005/0005030 A1 * | 1/2005 | Asai | .............................. | 709/249 |
| 2005/0078642 A1 | 4/2005 | Mayer et al. | | |
| 2005/0107089 A1 | 5/2005 | Fukui | | |
| 2005/0135528 A1 * | 6/2005 | Miyamoto | ..................... | 375/357 |

(Continued)

FOREIGN PATENT DOCUMENTS

| | | |
|---|---|---|
| CN | 1674537 | 9/2005 |
| EP | 1404043 | 3/2004 |

(Continued)

OTHER PUBLICATIONS

Korean Office Action issued on Nov. 2, 2010 in corresponding Korean Patent Application 10-2009-0003261.

(Continued)

*Primary Examiner* — Wing F Chan
*Assistant Examiner* — Razu Miah
(74) *Attorney, Agent, or Firm* — Fujitsu Patent Center

(57) ABSTRACT

A wireless communication apparatus (for example, a wireless LAN access point) sends to an opposite apparatus during connection (for example, a wireless LAN terminal) advance notice of disconnection that notifies disconnection to a transmission frame before sending a disconnection frame (a deauthentication frame). After the advance notice of disconnection, the disconnection frame is sent and a disconnection process is executed. Since advance notice of disconnection is executed before the disconnection frame is sent, unless the wireless communication apparatus or the opposite apparatus during connection receives advance notice of disconnection before the disconnection frame is received, the disconnection frame is ignored, that is, disconnection frames from apparatuses except the apparatus during connection is ignored, then, illegal connection disconnection can be prevented.

8 Claims, 13 Drawing Sheets

(56) References Cited

U.S. PATENT DOCUMENTS

| | | | |
|---|---|---|---|
| 2005/0213524 A1* | 9/2005 | Doragh et al. | 370/311 |
| 2005/0281269 A1* | 12/2005 | Choi | 370/395.2 |
| 2006/0034241 A1* | 2/2006 | Czaja et al. | 370/342 |
| 2006/0036741 A1* | 2/2006 | Kiss et al. | 709/227 |
| 2006/0126557 A1 | 6/2006 | Jung | |
| 2006/0274646 A1* | 12/2006 | Nakamura et al. | 370/216 |
| 2006/0294245 A1* | 12/2006 | Raguparan et al. | 709/227 |
| 2007/0073808 A1* | 3/2007 | Berrey et al. | 709/204 |
| 2007/0089163 A1* | 4/2007 | Denton | 726/2 |
| 2007/0190998 A1* | 8/2007 | Tanaka et al. | 455/423 |
| 2008/0045217 A1* | 2/2008 | Kojima | 455/436 |
| 2008/0046573 A1* | 2/2008 | Ropolyi et al. | 709/227 |
| 2009/0131029 A1* | 5/2009 | Osborn | 455/418 |
| 2009/0175447 A1* | 7/2009 | Adachi et al. | 380/270 |
| 2009/0196178 A1* | 8/2009 | Stewart et al. | 370/231 |

FOREIGN PATENT DOCUMENTS

| | | | |
|---|---|---|---|
| EP | 1580931 | A1 | 9/2005 |
| EP | 1734721 | A2 | 12/2006 |
| JP | 2004-056505 | | 2/2004 |
| JP | 2005-117488 | | 4/2005 |
| JP | 2005-287030 | | 10/2005 |
| JP | 2006-500837 | | 1/2006 |
| JP | 2007-116258 | | 5/2007 |
| KR | 2003-0062107 | | 7/2003 |
| WO | WO-02/45456 | A1 | 6/2002 |
| WO | WO-2004/030251 | | 4/2004 |

OTHER PUBLICATIONS

Chinese Office Action mailed May 25, 2011 for corresponding Chinese Patent Application No. 200910118467.5, with English-language translation.

"Japanese Office Action" mailed by JPO and corresponding to Japanese application No. 2008-143890 on Sep. 18, 2012, with English translation.

Extended European Search Report mailed Oct 11, 2013 for corresponding European Patent Application No. 09153452.9.

* cited by examiner

WIRELESS COMMUNICATION SYSTEM, WIRELESS COMMUNICATION APPARATUS, METHOD FOR DISCONNECTION PROCESS THEREOF, AND STORAGE MEDIUM

CROSS-REFERENCE TO RELATED APPLICATIONS

This application is based upon and claims the benefit of priority of the prior Japanese Patent Application No. 2008-143890, filed on May 30, 2008, the entire contents of which are incorporated herein by reference.

FIELD

The embodiments discussed herein relates to disconnection of wireless connection between wireless communication apparatuses such as wireless connection between a wireless LAN access point and a wireless LAN terminal in a wireless LAN (Local Area Network) system, particularly relates to a wireless communication system and a wireless communication apparatus in which advance notice of disconnection is applied before sending a deauthentication frame for a disconnection process and in which a disconnection process is executed, and relates to a method for a disconnection process thereof.

BACKGROUND

A wireless LAN system is popularly used as a communication system of a mobile terminal because the wireless LAN system has outstanding features such as versatility, inexpensiveness, and high flexibility for a position where a wireless LAN terminal is set. In such communication system, when a wireless LAN terminal communicates by radio, there are two modes. One is an infrastructure mode where the wireless LAN terminal communicates with another wireless LAN terminal or a node at a wired system via a wireless LAN access point. The other is an ad hoc mode where wireless LAN terminals communicate with each other directly. Protocol of such communication connection and disconnection thereof is set by a communication standard (a series of IEEE 802.11).

In this communication standard, it is provided that when a wireless LAN access point disconnects a wireless LAN terminal during connection, a disconnection frame (that is, a deauthentication frame) be sent from the wireless LAN access point to the wireless LAN terminal. There is no need to wait a response from the wireless LAN terminal after this disconnection frame was sent from a wireless LAN access point. The wireless LAN access point ends a disconnection process at the time when the disconnection frame has been sent.

Concerning disconnection of wireless connection, Japanese Laid-open Patent Publication No. 2007-116258 (paragraphs 0080, 0081 and 0082) discloses that when a slave device wirelessly connected to a plurality of wireless system master devices moves from an area of a wireless system master device connected to the slave to an area of another wireless system master device, advance notice of disconnection is sent from the wireless system master device connected to the slave to another wireless system master device. If the slave device determines that radio field intensity of the wireless system master device in the area where the slave device has moved is the highest-intensity, communication with the wireless system master device therein is established, and communication with wireless system master devices other than that of the highest intensity is disconnected.

Japanese Laid-open Patent Publication No. 2005-117488 (paragraphs 0017 and 0031, and FIGS. 1 and 2) discloses that an access point is a communication line (or a communication apparatus) used in order that a display and an intercom display and notify notice of communication disconnection, a password, etc. to a client in a specific area while a control unit monitors authentication of a client and time for communication connection, and controls connection with a client. Notice of password change is sent from the control unit of the access point to a client, and it is notified that the line is disconnected if this change order is not obeyed.

Japanese Laid-open Patent Publication No. 2005-287030 (Abstract, paragraphs 0004 and 0005, and FIG. 2) discloses that a request for dissociation is transmitted from a wireless local area network device of a host device to an access point of a wireless network to turn off a switch of a transceiver of the wireless LAN device.

In a disconnection process of wireless connection, a deauthentication frame sent from a wireless LAN access point is not encrypted. When this deauthentication frame is sent and received, a wireless LAN terminal does not authenticate a sending source. BSSID (Basic Service Set Identification) sent in disconnection is identification information for making a wireless LAN access point unique. BSSID is commonly a MAC (Media Access Control) address of a wireless interface of a wireless LAN access point. For this, if BSSID corresponds with a wireless LAN access point of a connection destination, a wireless LAN terminal accepts a deauthentication frame, and disconnects wireless LAN connection.

Since not encrypted, a deauthentication frame can be sent from another node easily. Since a sending source is not authenticated, wireless LAN connection can be easily disconnected by an irrelevant node of a third party. This means that disconnection by so-called "spoofing" can be easily performed. This prevents normal operation of a wireless LAN network.

Manufactures for security, which use the above reversely, exist. The manufactures send a dummy deauthentication frame to interrupt communication if a wireless LAN access point or a wireless LAN terminal, which are not allowed to be used, are detected.

For realizing normal wireless LAN operation, it is necessary to prevent disconnection by a deauthentication frame from a node of a third party.

Concerning such requests and problems, there is no disclosure nor suggestion thereof in any of Japanese Laid-open Patent Publication Nos. 2007-116258, 2005-117488 and 2005-287030, and no disclosure nor suggestion about structure, etc. solving them are presented.

SUMMARY

In order to achieve the above objects, aspects of embodiments of the invention are a wireless communication system in which a disconnection process is executed by a wireless communication apparatus sending a disconnection frame to an opposite apparatus connected to the apparatus, a wireless communication apparatus therefor and a method for a disconnection process thereof. The wireless communication apparatus sends advance notice of disconnection that notifies disconnection, with a transmission frame before sending the disconnection frame for the disconnection process, toward the opposite apparatus during connection, and after the advance notice of disconnection, the disconnection frame is sent to execute the disconnection process. In other words, advance notice of disconnection is issued as notice of sending the disconnection frame before such disconnection process, that is, sending the disconnection frame such as a deauthentication frame. Thus, if the wireless communication apparatus or the opposite apparatus during connection does not receive advance notice of disconnection before receiving the disconnection frame, acceptance of the disconnection frame is rejected, that is, disconnection frames from any other than apparatuses during connection are ignored so that illegal connection disconnection can be prevented to improve security of the disconnection process, and to enhance reliability of wireless connection.

To achieve the above objects, a wireless communication system of an aspect of an embodiment of the invention there is provided a wireless communication system in which a wireless communication apparatus sends a disconnection frame to an opposite apparatus during connection and a disconnection process is executed, the wireless communication apparatus including a processing unit that adds advance notice of disconnection, which notifies the disconnection, to a transmission frame before sending the disconnection frame for the disconnection process toward the opposite apparatus during connection, wherein after sending the advance notice of disconnection, the disconnection frame is sent to the opposite apparatus and the disconnection process is executed.

In such structure, if the wireless communication apparatus is about to execute the disconnection process to the opposite apparatus during connection, advance notice of disconnection that notifies disconnection is added by the processing measure to the transmission frame before sending the disconnection frame for the disconnection process, and the transmission frame is sent from the wireless communication apparatus to the opposite apparatus during connection. The disconnection frame after the advance notice of disconnection is accepted by the opposite apparatus, and the disconnection process is executed. If the advance notice of disconnection is not issued, the opposite apparatus rejects acceptance of the disconnection frame. Thus, a disconnection process by illegal disconnection frames from apparatuses except an apparatus during connection can be prevented, security of a disconnection process is improved, and reliability of wireless connection is enhanced. Therefore, the above objects can be achieved.

To achieve the above objects, in the above wireless communication system, preferably, the transmission frame may be any one of a frame expressing broadcast information representing existence of a communication apparatus, a frame representing control information of the communication apparatus and a frame set for the advance notice of disconnection. According to such structure, by adding the advance notice of disconnection to a beacon frame or a control frame before executing the disconnection process by the disconnection frame (the deauthentication frame), by the frame for the advance notice of disconnection, advance notice can be issued to an apparatus during connection before the disconnection process.

To achieve the above objects, a wireless communication apparatus of an aspect of an embodiment of the invention there is provided a wireless communication apparatus receiving a disconnection frame from an opposite apparatus during connection, and executing a disconnection process, the wireless communication apparatus including a receiving unit that receives a transmission frame from the opposite apparatus during connection; and a processing unit that recognizes disconnection notice from advance notice of disconnection, the advance notice of disconnection being added to a transmission frame, and executes the disconnection process based on the disconnection frame received within stand-by time after receiving the advance notice of disconnection.

In such structure, in case that the opposite apparatus is, for example, a relay measure of a wireless LAN system, that is, a wireless access point, and the wireless communication apparatus is, for example, a wireless LAN terminal connected with a wireless access point by radio, if the advance notice of disconnection is added to the transmission frame received from the wireless communication apparatus, the opposite apparatus that receives this advance notice of disconnection recognizes the advance notice of disconnection, and accepts the disconnection frame during the stand-by time period after the advance notice of disconnection, and the disconnection process is executed. Thus, a disconnection process by illegal disconnection frames from apparatuses except an apparatus during connection can be prevented, security of a disconnection process is improved, and reliability of wireless connection is enhanced. Therefore, the above objects can be achieved.

According to an aspect of an embodiment of the invention, there is provided a method for a disconnection process of a wireless communication apparatus receiving a disconnection frame from an opposite apparatus during connection, and executing a disconnection process, the method including recognizing disconnection notice from advance notice of disconnection, the advance notice of disconnection being added to a transmission frame; and executing the disconnection process based on the disconnection frame received within stand-by time after receiving the advance notice of disconnection.

According to an aspect of an embodiment of the invention, there is provided a computer readable storage medium storing a disconnection processing program of a wireless communication apparatus that executes a disconnection process by computer by receiving a disconnection frame from an opposite apparatus during connection, the program including the functions of recognizing disconnection notice from advance notice of disconnection, the advance notice of disconnection being added to a transmission frame; and executing the disconnection process based on the disconnection frame received within stand-by time after receiving the advance notice of disconnection.

The object and advantages of the invention will be realized and attained by means of the elements and combinations particularly pointed out in the claims.

It is to be understood that both the foregoing general description and the following detailed description are exemplary and explanatory and are not restrictive of the invention, as claimed.

Other objects, features and advantages of the present invention are more clearly understood by referring to the attached drawings and each of embodiments.

DESCRIPTION OF EMBODIMENTS

[a] First Embodiment

Figure 1:
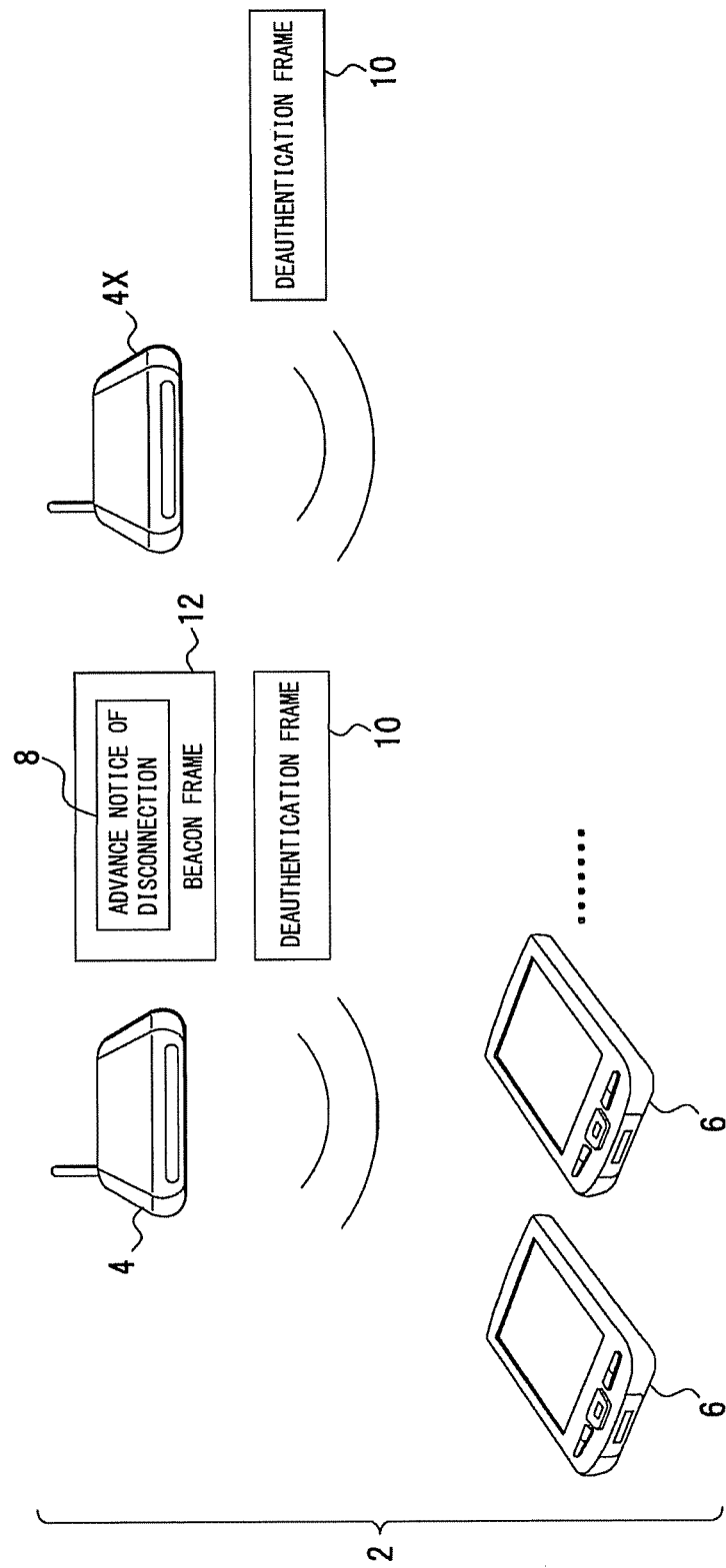
FIG. 1 depicts a wireless LAN system according to a first embodiment.

A first embodiment will now be described with reference to FIG. 1. FIG. 1 depicts a wireless LAN system according to a first embodiment. Structure depicted in FIG. 1 is one example, and the present invention is not limited to such structure.

This wireless LAN system 2 is one example of a wireless communication apparatus, a disconnection processing method and a disconnection processing program. To a wireless LAN access point 4, for example, a wireless LAN terminal 6 is connected as a single or a plurality of wireless LAN terminals. When connection with this wireless LAN terminal 6 is disconnected, advance notice of disconnection 8 is sent from the wireless LAN access point 4. After this advance notice of disconnection 8, as a disconnection frame, a deauthentication frame (hereinafter "a disconnection frame") 10 is sent. The advance notice of disconnection 8 is identification information that notifies disconnection of the wireless LAN terminal 6.

In this embodiment, the advance notice of disconnection 8 is added to a beacon frame 12 that is a transmission frame. The beacon frame 12 is a frame representing broadcast information that tells of existence of a communication apparatus. The advance notice of disconnection 8 may be added to a transmission frame except the beacon frame 12, for example, a frame representing control information of a communication apparatus (: a control frame). Or, a frame dedicating itself to advance notice of disconnection (: a frame for advance notice of disconnection) may be set.

The wireless LAN access point 4 is a wireless communication apparatus that configures a relay means for wireless communication of the wireless LAN terminal 6. In this embodiment, the wireless LAN access point 4 is a transmission means for transmitting the disconnection frame 10 to execute a disconnection process to the wireless LAN terminal 6 connected to the wireless LAN access point 4, and is a transmission means for transmitting the advance notice of disconnection 8 before a predetermined time of transmitting the disconnection frame 10. Concretely, the wireless LAN access point 4 notifies the advance notice of disconnection 8 for disconnecting the wireless LAN terminal 6 with the beacon frame 12 by adding the advance notice of disconnection 8 to a transmission frame if the wireless LAN terminal 6 during connection is disconnected, and after that, a time T as a time interval till the disconnection frame 10 is sent is decided. That is, to the wireless LAN terminal 6 during connection, it is notified by the advance notice of disconnection 8 added to the beacon frame 12 that a disconnection process is executed, before the disconnection process. The advance notice of disconnection 8 includes the time T when the disconnection frame 10 is sent from a time point of advance notice as time information and a stand-by time t (>T) as a predetermined time after the advance notice of disconnection 8 is received, in order to enable reception of the disconnection frame 10. The time T and the stand-by time t need not a constant time. If t>T, the time T and the stand-by time t may be an arbitrary time. An indefinite time can increase probability of avoiding an interrupt of the disconnection frame 10 by an illegal person.

The wireless LAN terminal 6 is, for example, a wireless communication apparatus that maintains communication with another wireless LAN terminal and executes reception and transmission of information by means of the wireless LAN access point 4 as a relay means. The wireless LAN terminal 6 is also a receiving means (receiving unit) for receiving a transmission frame from an opposite apparatus connected to the wireless LAN terminal 6, for example, the wireless LAN access point 4. In this case, in a disconnection process, the above described wireless LAN terminal 6 detects whether the advance notice of disconnection 8 exists in the beacon frame 12 sent from the wireless LAN access point 4 during connection. If the advance notice of disconnection 8 exists, the process moves to a state where a disconnection process executed on the basis of a disconnection frame from the wireless LAN access point 4 is accepted (a disconnection stand-by state). In that case, the above stand-by time t that is included in the advance notice of disconnection 8 is stored. Within this stand-by time t, a disconnection frame can be received. After the stand-by time t has passed, the wireless LAN terminal 6 returns to a state where a disconnection process from the wireless LAN access point 4 is not accepted (a disconnection process rejection state).

The wireless LAN terminal 6 that receives the disconnection frame 10 confirms whether reception of the disconnection frame 10 is within a certain time (the stand-by time t) after the advance notice of disconnection 8 is received from the wireless LAN access point 4. In case of being within the stand-by time t, a disconnection process thereof is accepted and wireless LAN connection is disconnected. If the stand-by time t has passed after reception of the advance notice of disconnection 8, or if the advance notice of disconnection 8 is not received, a disconnection process is not accepted even if the disconnection frame 10 is received, and wireless LAN connection is maintained.

In such wireless LAN system 2, if connection of the wireless LAN terminal 6 during connection is disconnected, the advance notice of disconnection 8 is sent from the wireless LAN access point 4 to the wireless LAN terminal 6. After the advance notice of disconnection 8 is sent, the disconnection frame 10 is sent. The wireless LAN terminal 6 accepts the disconnection frame 10 from the wireless LAN access point 4 that receives the advance notice of disconnection 8, and moves to a disconnection process. For the above, even if the disconnection frame 10 is sent from another wireless LAN access point 4X or other nodes from which the advance notice of disconnection 8 is not issued, a disconnection process of connection thereby is not executed, and wireless connection is maintained.

Figure 2:
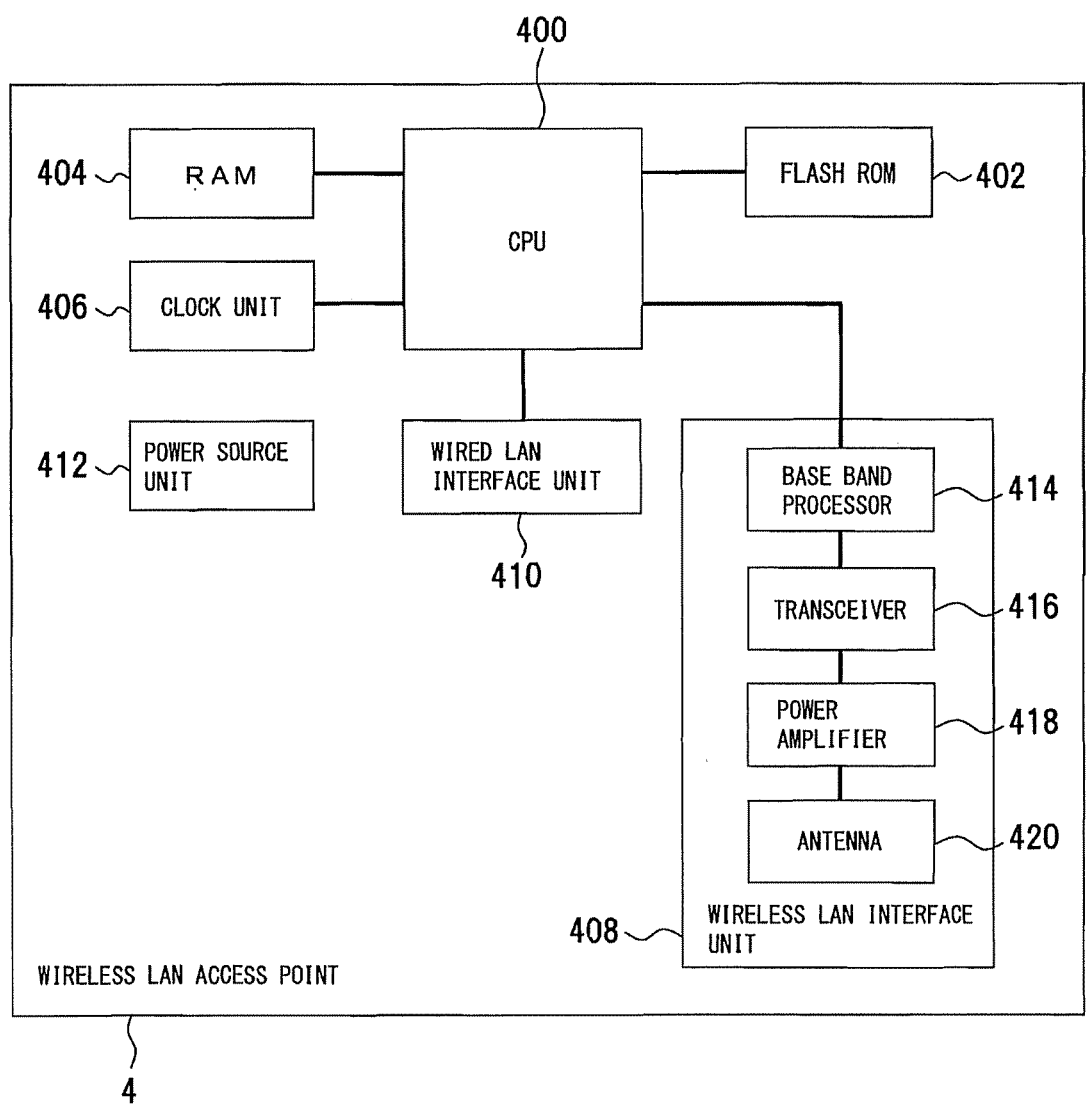
FIG. 2 depicts structure of an access point.

A wireless LAN access point will now be described with reference to FIG. 2. FIG. 2 depicts structure of an access point. Structure depicted in FIG. 2 is one example, and the present invention is not limited to such structure.

The wireless LAN access point 4 is a computer including a communication function by radio or wire. As depicted in FIG. 2, included are a CPU (Central Processing Unit) 400, a Flash ROM (Read-Only Memory) 402, a RAM (Random-Access Memory) 404, a clock unit 406, a wireless LAN interface unit 408, a wired LAN interface unit 410 and a power source unit 412.

The CPU 400 is one example of a processing means (processing unit) for executing transmission and reception of information, an advance notice process, a disconnection process, etc., and a control means of various function units. The CPU 400 executes an OS (Operating System) and an application program such as a disconnection process program in the Flash ROM 402. The Flash ROM 402 is one example of a program storing unit and a data storing unit. The Flash ROM 402 stores the above OS and application program, and a data table is provided in the data storing unit thereof. The RAM 404 configures a working area.

The clock unit 406 is one example of a timing means. The clock unit 406 times a predetermined time from a time point of issuance of advance notice information of disconnection. The above interval time T is timed by the clock unit 406.

The wireless LAN interface unit 408 is a means for wireless connection for the wireless LAN terminal 6, and includes a base band processor 414, a transceiver 416, a power amplifier 418 and an antenna 420. The base band processor 414 is a means for generating a base band signal to send and receive information. The transceiver 416 is a means for generating a transmission signal that is a carrier signal modulated by a base band signal or a means for demodulating a base band signal from a reception signal. The power amplifier 418 is a means for amplifying a transmission signal or a reception signal. The antenna 420 sends out a transmission signal outputted from the power amplifier 418 to the wireless LAN terminal 6 as a wireless signal, or receives a wireless signal from the wireless LAN terminal 6 to input the wireless signal to the power amplifier 418 as a reception signal.

The wired LAN interface unit 410 is a wired connection means to a wired LAN terminal not depicted. The power source unit 412 is a power supply means, and supplies driving power to various function units such as the CPU 400 and the wireless LAN interface unit 408.

According to such structure, the wireless LAN terminal 6 can be wirelessly connected through the wireless LAN interface unit 408 of the wireless LAN access point 4, the above described advance notice of disconnection 8 is sent to the wireless LAN terminal 6 during connection by the beacon frame 12, and a process of sending the disconnection frame 10 can be executed after the time T has passed since a time point of sending the advance notice of disconnection 8.

Figure 3:
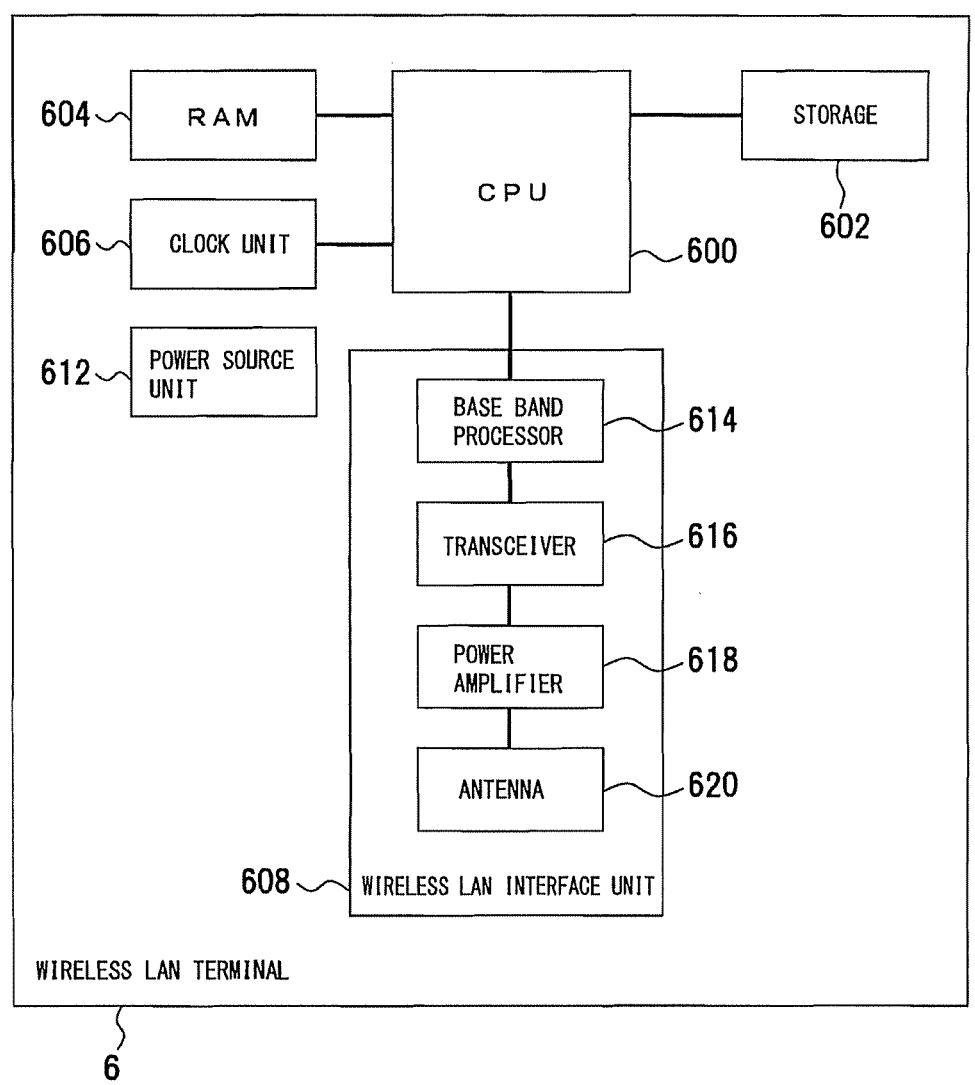
FIG. 3 depicts structure of a wireless LAN terminal.

A wireless LAN terminal will now be described with reference to FIG. 3. FIG. 3 depicts structure of a wireless LAN terminal. Structure depicted in FIG. 3 is one example, and the present invention is not limited to such structure.

The wireless LAN terminal 6 is a computer provided with a communication function by radio with various wireless relay means including the wireless LAN access point 4. As depicted in FIG. 3, included are a CPU 600, a storage 602, a RAM 604, a clock unit 606, a wireless LAN interface unit 608 and a power source unit 612.

The CPU 600 is one example of an information processing means (information processing unit) for transmitting and receiving information, a disconnection process, etc. and a control means of various function units. The CPU 600 executes an OS and an application program such as a disconnection process program subroutine in the storage 602. The storage 602 is one example of a program storing unit and a data storing unit. The storage 602 stores the above OS and application program, and a data table is provided in the data storing unit thereof. The RAM 604 configures a working area.

The clock unit 606 is one example of a timing means. The clock unit 606 times the stand-by time t from a time point of issuance of the advance notice of disconnection 8. The disconnection frame 10 can be accepted until this stand-by time t has passed.

The wireless LAN interface unit 608 is a means for wireless connection for the wireless LAN access point 4, and includes a base band processor 614, a transceiver 616, a power amplifier 618 and an antenna 620. The base band processor 614 is a means for generating a base band signal to send and receive information. The transceiver 616 is a means for generating a transmission signal that is a carrier signal modulated by a base band signal or a means for demodulating a base band signal from a reception signal. The power amplifier 618 is a means for amplifying a transmission signal or a reception signal. The antenna 620 sends out a transmission signal outputted from the power amplifier 618 to the wireless LAN access point 4 as a wireless signal, or receives a wireless signal from the wireless LAN access point 4 to input the wireless signal to the power amplifier 618 as a reception signal.

The power source unit 612 is a power supply means, and supplies driving power to various function units such as the CPU 600 and the wireless LAN interface unit 608.

According to such structure, wireless connection to the wireless LAN access point 4 can be performed through the wireless LAN interface unit 608, if the above described advance notice of disconnection 8 is received from the wireless LAN access point 4 during connection, reception of the disconnection frame 10 is waited for the stand-by time t after the advance notice of disconnection 8, and based on reception of the disconnection frame 10, a disconnection process can be executed.

Figure 4:
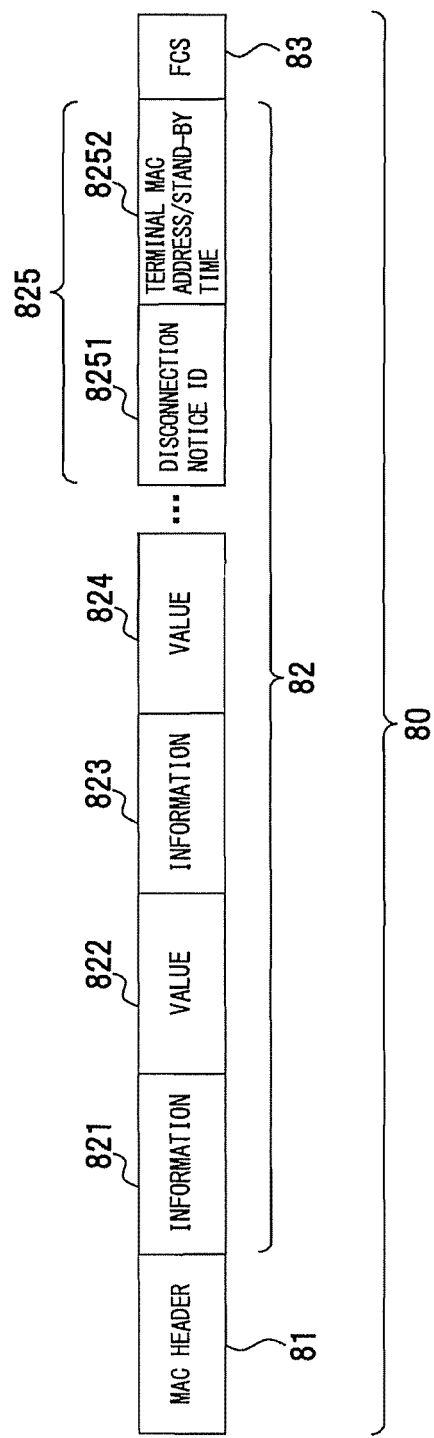
FIG. 4 depicts a disconnection notice frame.

Advance notice of disconnection will now be described with reference to FIG. 4. FIG. 4 depicts a disconnection notice frame. Structure depicted in FIG. 4 is one example, and the present invention is not limited to such structure. In FIG. 4, the same components as those in FIG. 1 are denoted by the same reference numerals.

This disconnection notice frame 80 is one example of identification information representing advance notice of disconnection, and one example of a method of adding an information element as advance notice of disconnection to the beacon frame 12. As depicted in FIG. 4, a MAC (Medium Access Control) header 81, a frame body 82 and an FCS (Frame Check Sequence) 83 are included in the disconnection notice frame 80. The beacon frame 12 is information for broadcasting various information necessary for communication with a periphery wireless station, and is sent by a base station (in this case, a wireless LAN access point) periodically. The beacon frame 12 plays a role of notifying existence of a wireless cell to a terminal station (in this case, a wireless LAN terminal).

The MAC header 81 includes frame control information, duration/ID, an address of a sending destination, an address of a sending source, BSS (Basic Service Set) ID and sequence control information. The duration/ID is time when a wireless line is scheduled to be used. The address of a sending destination is an address of a wireless LAN terminal, which is a sending destination. The address of a sending source is an address of a wireless LAN access point, which is a sending source. The BSSID is identification information of a BSS, that is, a wireless cell, and is expressed by a MAC address of a wireless LAN access point, which is a base station. The sequence control information represents a sequence number of a MAC frame and a fragment number for fragment.

The frame body 82 is a storing unit for transmission data. A disconnection information element 825 representative of the advance notice of disconnection 8 is set for the frame body 82 along with information 821, a value 822, information 823 and a value 824. This disconnection information element 825 stores disconnection notice ID 8251 and a terminal MAC address/stand-by time 8252. The information 821, the value 822, the information 823 and the value 824 represent transmission data and the volume of data thereof. The disconnection notice ID 8251 is advance notice of disconnection information. A terminal MAC address representing a wireless LAN terminal that disconnection notice is notified to, and the above stand-by time t since disconnection notice are set for the terminal MAC address/stand-by time 8252.

The FCS 83 is a storing unit for an error detection code. In this case, error detection codes of the MAC header 81 and the frame body 82 are stored.

If such of disconnection notice frame 80 is sent to the wireless LAN terminal 6 that is an object of disconnection before the disconnection frame 10 is sent, an object of disconnection is identified by a terminal MAC address in the wireless LAN terminal 6 receiving the disconnection notice frame 80 and the stand-by time t when the disconnection frame 10 since disconnection notice is accepted is set. If the disconnection frame 10 arrives within the stand-by time t, a disconnection process is executed.

Figure 5:
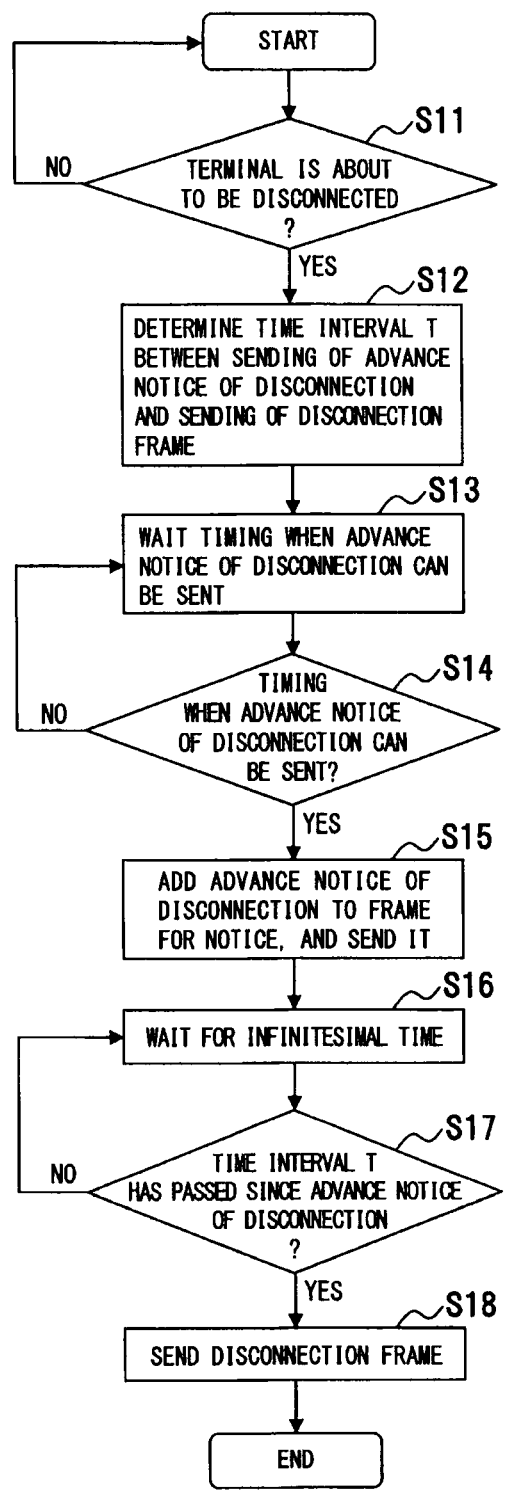
FIG. 5 is a flowchart showing processing procedure of a wireless LAN access point.

A process at a wireless LAN access point side will now be described with reference to FIG. 5. FIG. 5 is a flowchart depicting processing procedure of a wireless LAN access point. Structure depicted in FIG. 5 is one example, and the present invention is not limited to such structure.

This processing procedure is one example of a method for a disconnection process and a disconnection processing program, is a process at a wireless LAN access point side, and includes a process of adding the stand-by time t.

In this processing procedure, as depicted in FIG. 5, whether a wireless LAN terminal is about to be disconnected is determined (step S11). If so (YES of step S11), the time interval T between sending of advance notice of disconnection and sending of a disconnection frame is determined (step S12). Timing when advance notice of disconnection can be sent is waited (step S13), and whether timing is when advance notice of disconnection can be sent is determined (step S14). If timing is when advance notice of disconnection can be sent (YES of step S14), advance notice of disconnection is added to, for example, the beacon frame 12 as a frame for notice, and is sent (step S15). If timing is not when advance notice of disconnection can be sent (NO of step S14), a stand-by state for sending advance notice of disconnection is started.

If advance notice of disconnection is sent, the process 10 waits for infinitesimal time (step S16), and it is determined whether the time interval T has passed since advance notice of disconnection (step S17). If the time interval T has passed (YES of step S17), a disconnection frame for a disconnection process is sent (step S18) and the process is ended.

Figure 6:
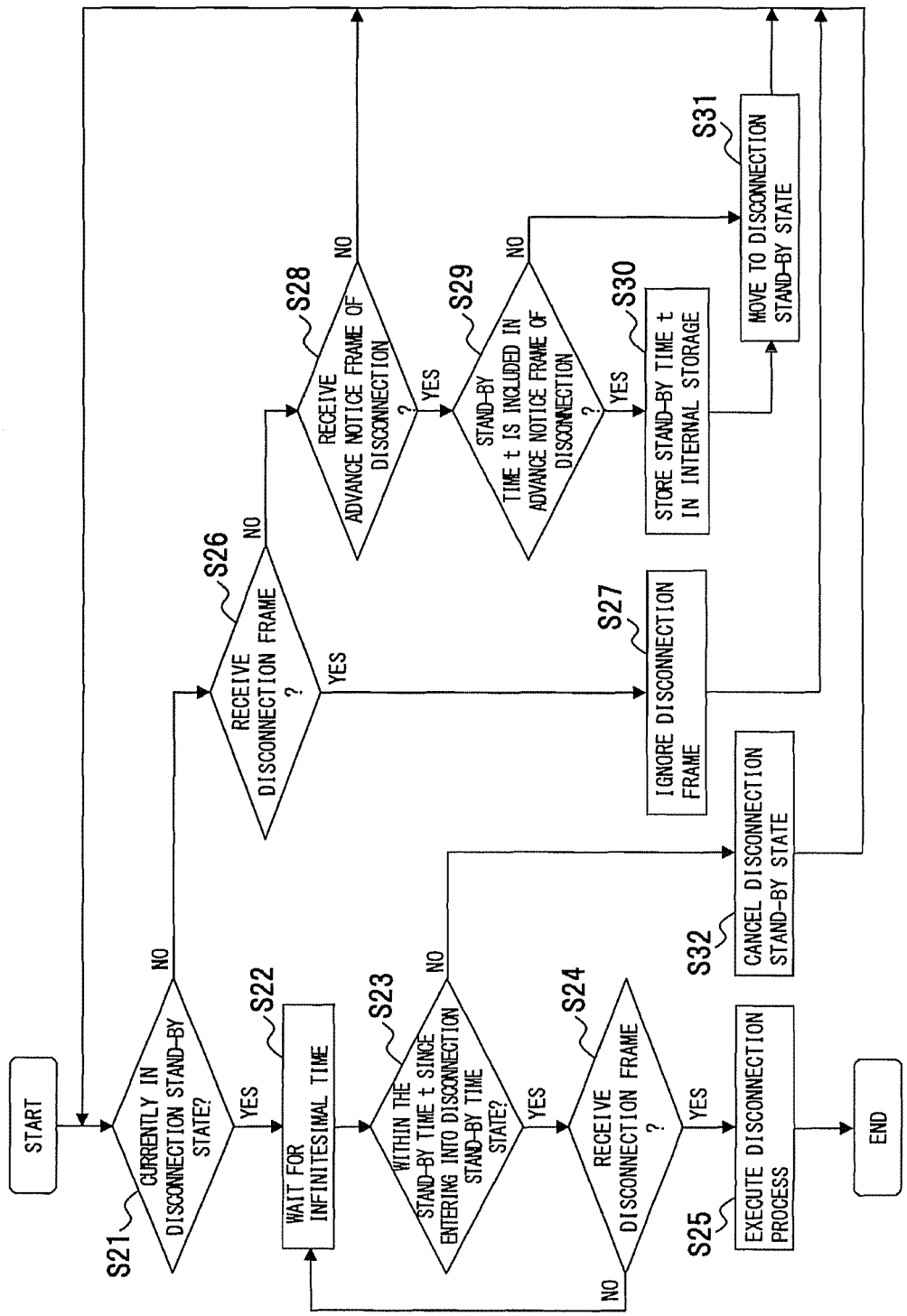
FIG. 6 is a flowchart showing processing procedure of a wireless LAN terminal.

A process at a wireless LAN terminal side will now be described with reference to FIG. 6. FIG. 6 is a flowchart showing processing procedure of a wireless LAN terminal. Structure depicted in FIG. 6 is one example, and the present invention is not limited to such structure.

This processing procedure is one example of a method for a disconnection process and a disconnection processing program, and is a process at a wireless LAN terminal side corresponding to the flowchart in FIG. 5.

In this processing procedure, as depicted in FIG. 6, whether to be currently in a disconnection stand-by state is determined (step S21). If in a disconnection stand-by state (YES of step S21), the process waits for infinitesimal time (step S22). It is determined whether to be within the stand-by time t or not since entering into a disconnection stand-by time state (step S23). If within the stand-by time state t (YES of step S23), whether the disconnection frame 10 is received is determined (step S24). If the disconnection frame 10 is received (YES of step S24), a disconnection process is executed (step S25) and the process is ended.

In step S21, if not currently in a disconnection stand-by state (NO of step S21), whether the disconnection frame 10 is received is determined (step S26). If the disconnection frame 10 is received (YES of step S26), the disconnection frame 10 is ignored (step S27) and the process returns to step S21.

In step S26, if the disconnection frame 10 is not received (NO of step S26), whether the advance notice frame of disconnection 8 is received is determined (step S28). Unless the advance notice frame of disconnection 8 is received (NO of step S28), the process returns to step S21. If the advance notice frame of disconnection 8 is received (YES of step S28) whether the stand-by time t is included in the advance notice frame of disconnection 8 is determined (step S29). If the stand-by time t is included (YES of step S29), the stand-by time t is stored in a storage (a data storing unit) (step S30). Unless the stand-by time t is included in the advance notice frame of disconnection 8 (NO of step S29), the process moves to a disconnection stand-by state (step S31) and returns to step S21.

In step S23, if not being within the stand-by time t since entering into a disconnection stand-by state, that is, after the stand-by time t has passed (NO of step S23), a disconnection stand-by state is cancelled (step S32) and the process returns to step S21.

Figure 7:
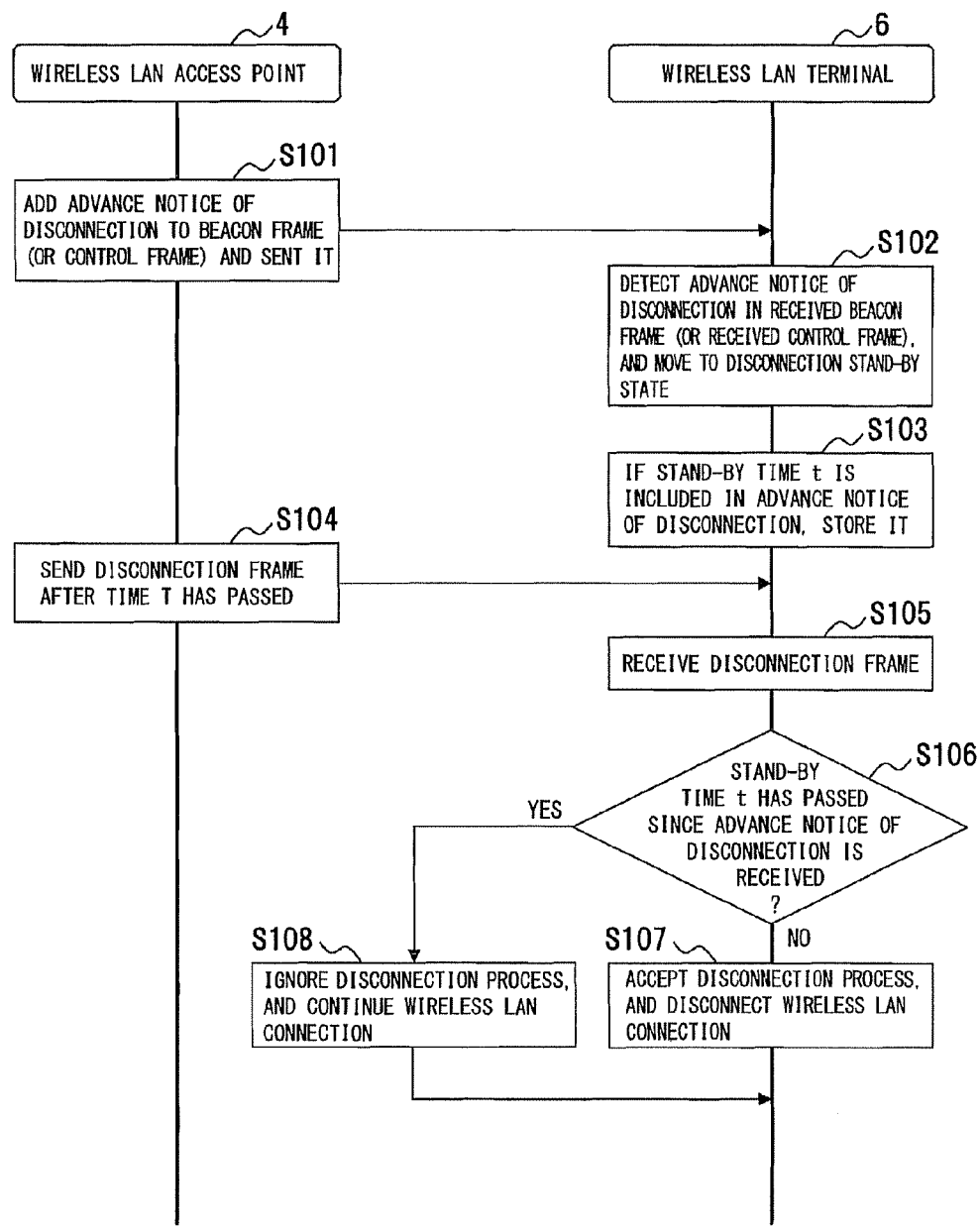
FIG. 7 is a flowchart showing a processing sequence between a wireless LAN access point and a wireless LAN terminal.

A process between a wireless LAN access point and a wireless LAN terminal will now be described with reference to FIG. 7. FIG. 7 is a flowchart showing a processing sequence between a wireless LAN access point and a wireless LAN terminal. Structure depicted in FIG. 7 is one example, and the present invention is not limited to such structure.

This processing procedure is one example of a method for a disconnection process and a disconnection processing program. In this embodiment, a beacon frame in which advance notice of disconnection is regarded as a frame for notice is exemplified. As described in steps S101 and S102 in FIG. 7, advance notice of disconnection may be added to a control frame instead of a beacon frame.

In this processing procedure, as depicted in FIG. 7, advance notice of disconnection is added to a beacon frame (or a control frame) and sent, from the wireless LAN access point 4 (step S101). At the wireless LAN terminal 6 that receives this advance notice of disconnection, if advance notice of disconnection is detected in the received beacon frame (or the received control frame), the process moves to a disconnection stand-by state (step S102). If the stand-by time t is included in advance notice of disconnection, the stand-by time t is stored (step S103) and a disconnection stand-by state is maintained.

The wireless LAN access point 4 sends a disconnection frame after sending of advance notice of disconnection and after the time interval T has passed (step S104). The wireless LAN terminal 6 receives this disconnection frame (step S105), and determines whether the stand-by time t has passed since advance notice of disconnection is received (step S106). Unless the stand-by time t has passed, that is, if within the stand-by time t (No of step S106), a disconnection process is accepted, and wireless LAN connection is disconnected (step S107). If the stand-by time t has passed, that is, if a disconnection frame is received after the stand-by time t (YES of step S106) reception of a disconnection frame is ignored and without executing a disconnection process, wireless LAN connection is continued (step S108).

Figure 8:
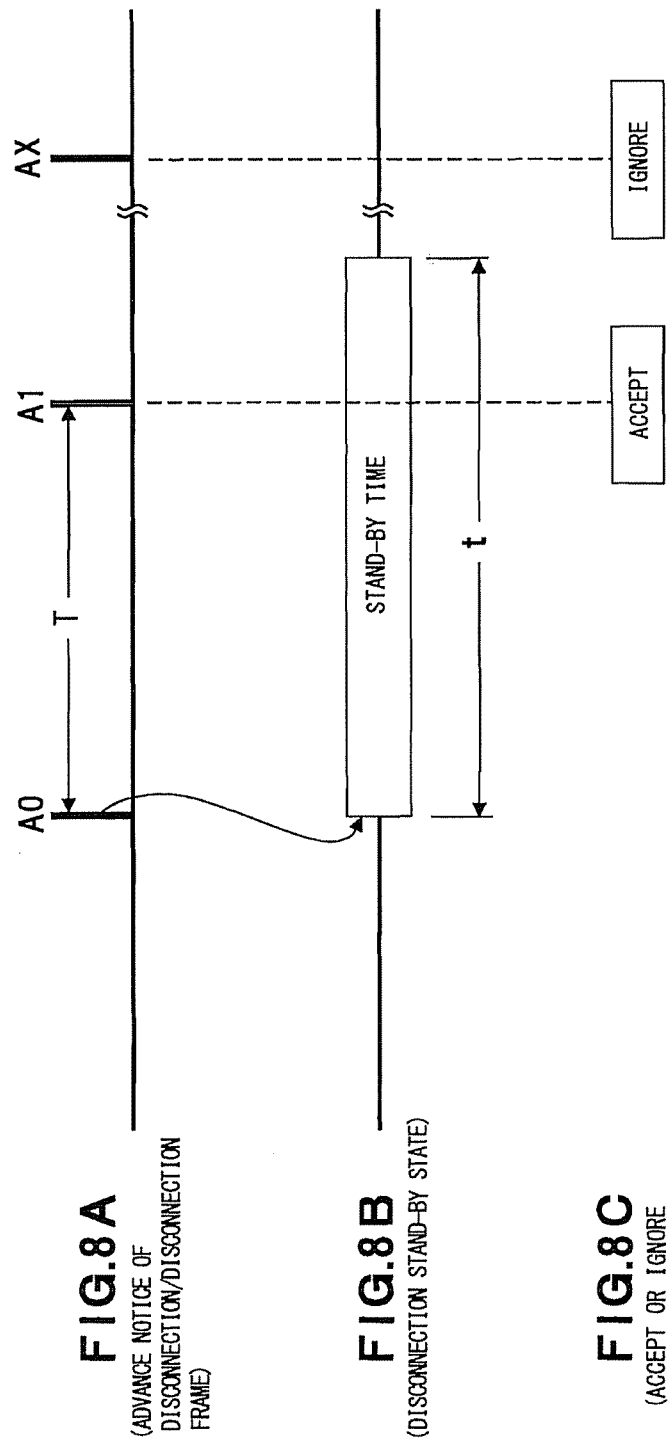
FIGS. 8A-8C are timing charts showing operation when a disconnection process or connection continuation is executed.

A disconnection process or a process of connection continuation will now be described with reference to FIGS. 8A-8C. FIGS. 8A-8C are timing charts depicting operation when a disconnection process or connection continuation is executed. Structure depicted in FIGS. 8A-8C is one example, and the present invention is not limited to such structure.

In FIG. 8A, A0 is advance notice of disconnection issued from the wireless LAN access point 4, A1 is a disconnection frame issued from the wireless LAN access point 4 and AX is a disconnection frame issued from the wireless LAN access point 4X. When the advance notice of disconnection (A0) is received by the wireless LAN terminal 6 during connection with the wireless LAN access point 4, the process moves to a disconnection stand-by state by the stand-by time t depicted in FIG. 8B.

The disconnection frame (A1) is issued from the wireless LAN access point 4 after the time interval T since the advance notice of disconnection (A0). Because this disconnection frame (A1) is received in the stand-by time t of the wireless LAN terminal 6 in a disconnection stand-by state, as depicted in FIG. 8C, the disconnection frame (A1) is accepted by the wireless LAN terminal 6, and the above described disconnection process is executed in the wireless LAN terminal 6.

In this case, the disconnection frame (AX) that is issued from another wireless LAN access point 4X is ignored since issuance thereof is after the stand-by time t.

Further in this case, if the disconnection frame (AX) is issued from the wireless LAN access point 4X, the disconnection frame (AX) is ignored at time points except the stand-by time t. The process does not move to a disconnection process thereby. Even if the disconnection frame (AX) arrives from the wireless LAN access point 4X within the stand-by time t thus a disconnection process thereby is executed, there is no inconvenience since the process is already in a disconnection stand-by state.

As to the above described first embodiment, modification, features and advantages are listed as follows.

(1) When the wireless LAN terminal 6 is connected to the wireless LAN access point 4, by adding advance notice of disconnection to a beacon frame just before the wireless LAN access point 4 is about to disconnect the wireless LAN terminal 6, it is notified to the wireless LAN terminal 6 in advance that a disconnection process is executed. Thus, a high security disconnection process can be performed.

(2) When the wireless LAN terminal 6 is connected to the wireless LAN access point 4, if advance notice of disconnection to the wireless LAN terminal 6 is added to a beacon frame sent from the wireless LAN access point 4, a disconnection frame received from the wireless LAN access point 4 is accepted if just after sending the beacon frame. If advance notice of disconnection is not added to beacon frame or if not just after sending thereof, only a disconnection frame from a legal wireless LAN access point can be accepted by ignoring a disconnection frame, and thus, security of a disconnection process can be improved.

(3) When the wireless LAN terminal 6 is connected to the wireless LAN access point 4, by advance notice of disconnection being added to a control frame just before the wireless LAN access point 4 is about to disconnect the wireless LAN terminal 6, a disconnection process being executed is notified to the wireless LAN terminal 6 in advance. Thus, a disconnection process with high security can be performed.

(4) When the wireless LAN terminal 6 is connected to the wireless LAN access point 4, if advance notice of disconnection to the wireless LAN terminal 6 is added to a control frame sent from the wireless LAN access point 4, a disconnection frame received from the wireless LAN access point 4 is accepted if just after sending the control frame. If advance notice of disconnection is not added to a control frame or if not just after sending thereof, only a disconnection frame from the legal wireless LAN access point 4 can be accepted by ignoring a disconnection frame, and thus, security of a disconnection process can be improved even if a control frame is used.

(5) After advance notice of disconnection is sent, if standby time for receiving a disconnection frame is notified to the wireless LAN terminal 6 by determining an interval until sending a disconnection frame, adding the interval to a beacon frame or a control frame and sending the beacon frame or the control frame, after reception of advance notice of disconnection, a state where a disconnection frame can be received at the wireless LAN terminal 6 side can be set in a stand-by time. Thus, security of a disconnection process can be improved.

(6) When the wireless LAN access point 4 disconnects the wireless LAN terminal 6 during connection, by sending advance notice of disconnection just before a disconnection frame is sent, it is determined at the wireless LAN terminal 6 that whether a disconnection frame is sent from the legal wireless LAN access point 4. Since the process can be moved to a disconnection process based on a determination result thereof, disconnection by spoofing can be prevented, and thus, security of a disconnection process can be improved.

(7) The wireless LAN terminal 6 accepts only a disconnection frame from the wireless LAN access point 4 during connection. Even if a disconnection frame is received from other nodes, disconnection of wireless LAN connection can be prevented, and reliability of connection can be enhanced.

(8) For the above descriptions, since security on a disconnection process is improved, disconnection attack of wireless LAN connection by sending a deauthentication frame of a third party can be prevented. Even if such attack is performed, connection can be maintained, and thus, reliability of connection is improved.

Concerning advance notice of disconnection, if an information element is newly defined and added, even if wireless LAN terminals that are not respondent to a function of the present embodiment are mixed in the combination of a wireless LAN access point and a wireless LAN terminal, the above wireless LAN terminal can receive a beacon frame that advance notice of disconnection is added to, and can coexist with the combination thereof.

[b] Second Embodiment

Figure 9:
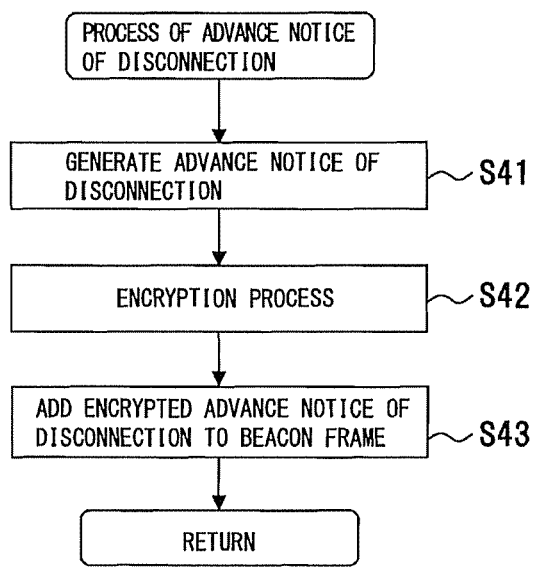
FIG. 9 is a flowchart showing processing procedure of advance notice of disconnection according to a second embodiment.

A second embodiment will now be described with reference to FIG. 9. FIG. 9 depicts processing procedure of advance notice of disconnection according to a second embodiment. Structure depicted in FIG. 9 is one example, and the present invention is not limited to such structure.

In the first embodiment, after advance notice of disconnection is generated, a process is executed that advance notice of disconnection is added to a beacon frame or a control frame. If advance notice of disconnection is encrypted, security can be more improved.

This processing procedure is, after generation of advance notice of disconnection, to add an encryption process. As depicted in FIG. 9, generation of advance notice of disconnection is executed (step S41), an encryption process is performed on this advance notice of disconnection (step S42)

and the encrypted advance notice of disconnection is added to a beacon frame (step S43). After this process, sending is performed.

In this embodiment, a beacon frame is exemplified. Encrypted advance notice of disconnection may be added to a control frame.

According to such structure, by encrypting advance notice of disconnection with an encryption key used in data communication with a wireless LAN terminal 6, adding the encrypted advance notice of disconnection and sending it, only a terminal of an object of disconnection can be made to receive advance notice of disconnection.

In a beacon frame or a control frame sent from a wireless LAN access point 4, advance notice of disconnection is decrypted by an encryption key used in data communication. When advance notice of disconnection to the wireless LAN terminal 6 is added, if just after sending the beacon frame or the control frame, a disconnection frame received from the wireless LAN access point 4 is accepted. When advance notice of disconnection is not added to a beacon frame or a control frame, or when not just after sending thereof, only a disconnection frame from a legal access point may be accepted by ignoring a disconnection frame.

According to such structure, addition of advance notice of disconnection after encryption by an encryption key used in data communication with a wireless LAN terminal to be notified can make only a wireless LAN terminal of an object of disconnection receive advance notice of disconnection. If seen from a wireless LAN terminal side, attack to send advance notice of disconnection by an irrelevant wireless LAN node spoofing a wireless LAN access point during connection can be prevented.

[c] Third Embodiment

Figure 10:
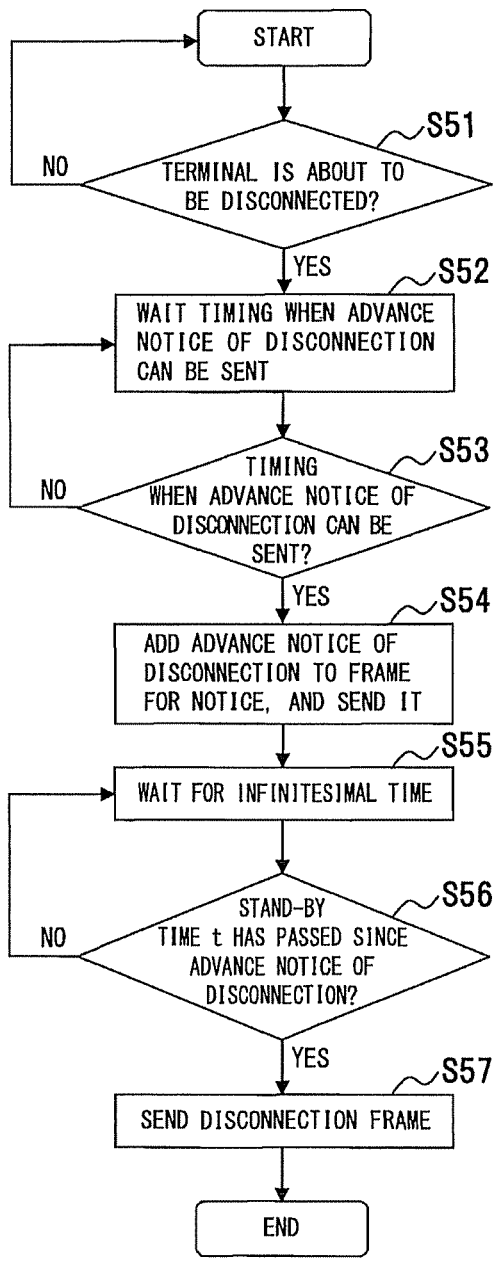
FIG. 10 is a flowchart showing processing procedure of a wireless LAN access point according to a third embodiment.

A third embodiment will now be described with reference to FIG. 10. FIG. 10 is a flowchart showing processing procedure of a wireless LAN access point according to a third embodiment. Structure depicted in FIG. 10 is one example, and the present invention is not limited to such structure.

In the first embodiment, the time interval T is set between sending of advance notice of disconnection and sending of a disconnection frame. Without setting of the time interval T, advance notice of disconnection may be sent at optional timing when advance notice of disconnection can be sent.

In this processing procedure, as depicted in FIG. 10, whether a wireless LAN terminal is about to be disconnected is determined (step S51). If so (YES of step S51), timing when advance notice of disconnection can be sent is waited (step S52), and whether timing is when advance notice of disconnection can be sent is determined (step S53). If timing is when advance notice of disconnection can be sent (YES of step S53), advance notice of disconnection is added to, for example, a beacon frame 12 as a frame for notice, and is sent (step S54). If timing is not when advance notice of disconnection can be sent (NO of step S53), a stand-by state for sending advance notice of disconnection is started.

If advance notice of disconnection is sent, the process waits for infinitesimal time (step S55), and it is determined whether a stand-by time t has passed since advance notice of disconnection (step S56). If the stand-by time t has passed (YES of step S55), a disconnection frame for a disconnection process is sent (step S57) and the process is ended.

[d] Fourth Embodiment

Figure 11:
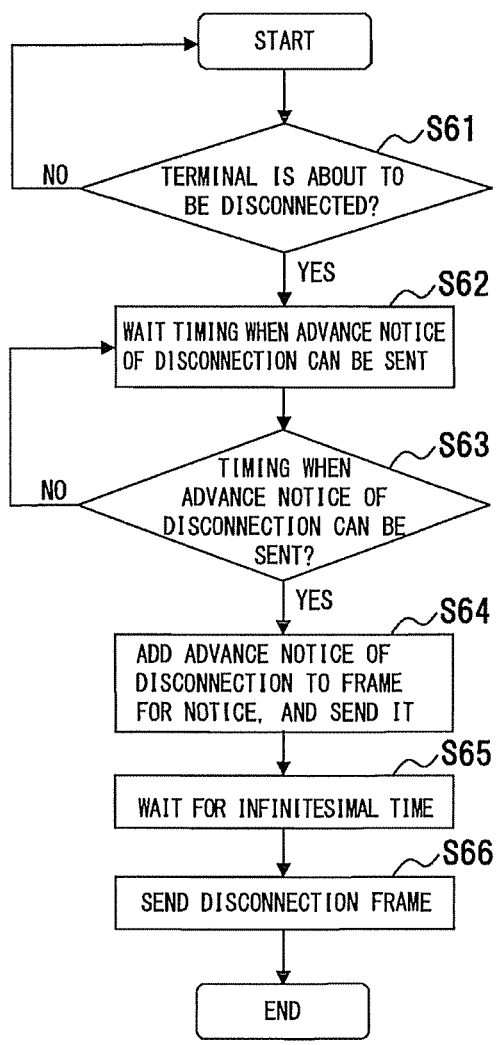
FIG. 11 is a flowchart showing processing procedure of a wireless LAN access point according to a fourth embodiment.

A fourth embodiment will now be described with reference to FIG. 11. FIG. 11 is a flowchart depicting processing procedure of a wireless LAN access point according to a fourth embodiment. Structure depicted in FIG. 11 is one example, and the present invention is not limited to such structure.

In the third embodiment, the stand-by time t is set. Without setting the stand-by time t, a disconnection frame may be sent at optional timing when a disconnection frame can be sent.

In this processing procedure, as depicted in FIG. 11, whether a wireless LAN terminal is about to be disconnected is determined (step S61). If so (YES of step S61), timing when advance notice of disconnection can be sent is waited (step S62), and whether timing is when advance notice of disconnection can be sent is determined (step S63) If timing is when advance notice of disconnection can be sent (YES of step S63), advance notice of disconnection is added to, for example, a beacon frame as a frame for notice, and is sent (step S64). If timing is not when advance notice of disconnection can be sent (NO of step S63), a stand-by state for sending advance notice of disconnection is started. If advance notice of disconnection is sent, the process waits for infinitesimal time (step S65), a disconnection frame for a disconnection process is sent (step S66) and the process is ended.

It is described that a wireless LAN access point notifies a wireless LAN terminal of interval between sending of advance notice of disconnection and sending of a disconnection frame as the stand-by time t. If the stand-by time t is fixed as a fixing value by a standard, etc., and both of a wireless LAN access point and a wireless LAN terminal know the stand-by time t, the stand-by time t may not be included in advance notice of disconnection. In this case, a wireless LAN terminal may use the stand-by time t that the wireless LAN terminal itself records as a period for waiting since reception of advance notice of disconnection.

[e] Fifth Embodiment

Figure 12:
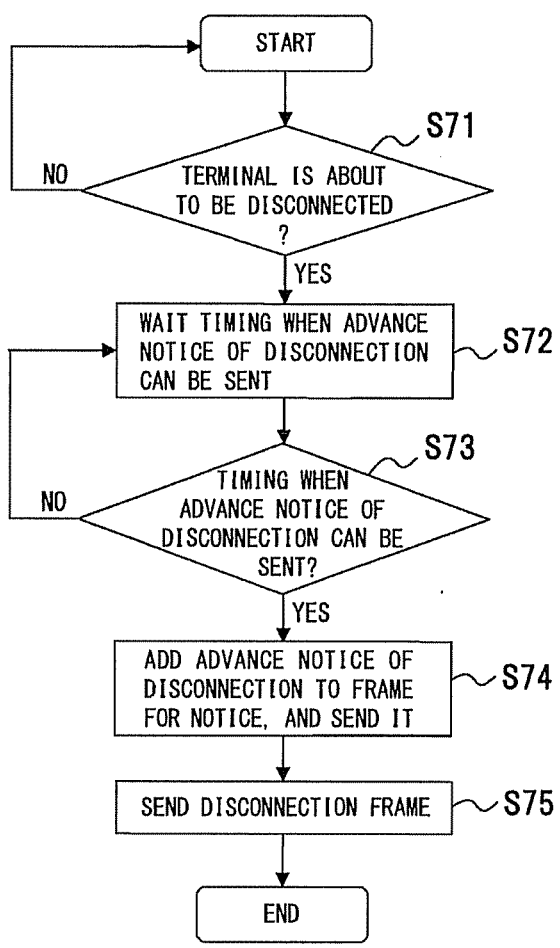
FIG. 12 is a flowchart showing processing procedure of a wireless LAN access point according to a fifth embodiment.
Figure 13:
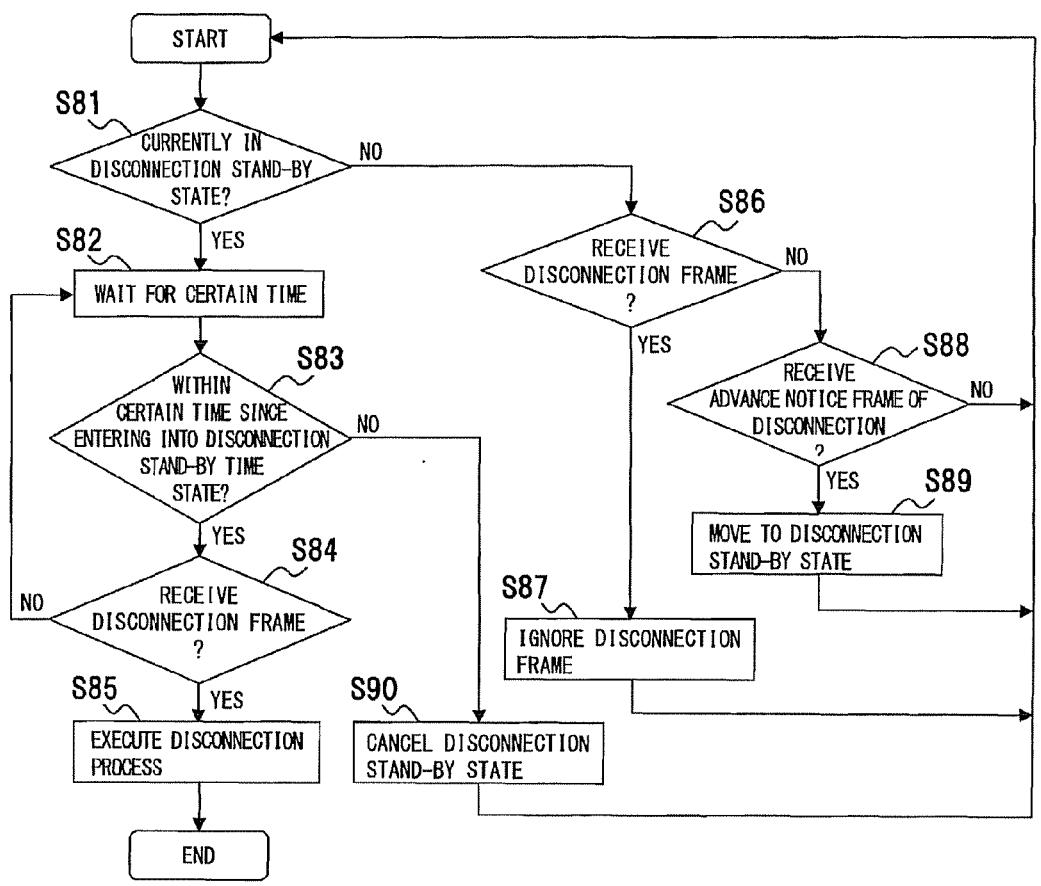
FIG. 13 is a flowchart showing processing procedure of a wireless LAN terminal corresponding to the processing procedure of FIG. 12.

A fifth embodiment will now be described with reference to FIGS. 12 and 13. FIG. 12 is a flowchart depicting processing procedure of a wireless LAN access point according to a fifth embodiment and FIG. 13 is a flowchart depicting processing procedure of a wireless LAN terminal. Structure depicted in FIGS. 12 and 13 are one example, and the present invention is not limited to such structure.

In the fourth embodiment, infinitesimal time stand-by (step S65) is set. This infinitesimal time stand-by, that is, certain time stand-by may be omitted, and a disconnection frame may be sent at optical timing when the disconnection frame can be sent.

In this processing procedure, as depicted in FIG. 12, whether a wireless LAN terminal is about to be disconnected is determined (step S71) If so (YES of step S71), timing when advance notice of disconnection can be sent is waited (step S72), and whether timing is when advance notice of disconnection can be sent is determined (step S73). If timing is when advance notice of disconnection can be sent (YES of step S73), advance notice of disconnection is added to, for example, a beacon frame as a frame for notice, and is sent (step S74). If timing is not when advance notice of disconnection can be sent (NO of step S73), a stand-by state for sending advance notice of disconnection is started. After sending this advance notice of disconnection, a disconnection frame for a disconnection process at optional timing is sent (step S75) and the process is ended.

Like the above, if a disconnection frame is sent after advance notice of disconnection is sent without setting a stand-by time t or certain infinitesimal time, security can be more improved without being known time setting by illegal persons.

Correspondingly to such process of a wireless LAN access point 4, in processing procedure of a wireless LAN terminal 6, as depicted in FIG. 13, whether to be currently in a disconnection stand-by state is determined (step S81). If in a disconnection stand-by state (YES of step S81), the process waits for certain time (step S82). It is determined whether to be within certain time or not since entering into a disconnection stand-by time state (step S83). If within certain time (YES of step S83), whether a disconnection frame 10 is received is determined (step S84). If the disconnection frame 10 is received (YES of step S84), a disconnection process is executed (step S85) and the process is ended.

In step S81, if not in a disconnection stand-by state currently (NO of step S81), whether the disconnection frame 10 is received is determined (step S86). If the disconnection frame 10 is received (YES of step S86), the disconnection frame 10 is ignored (step S87) and the process returns to step S81.

In step S86, if the disconnection frame 10 is not received (N of step S86), whether advance notice frame of disconnection is received is determined (step S88). Unless the advance notice frame of disconnection is received (NO of step S88), the process returns to step S81. If the advance notice frame of disconnection is received (YES of step S88), the process moves to a disconnection stand-by state (step S89) and returns to step S81.

In step S83, if certain time has passed since entering into a disconnection stand-by state (NO of step S83), a disconnection stand-by state is cancelled (step S90) and the process returns to step S81.

[f] Other Embodiments (1) In the above embodiments, structure is described that advance notice of disconnection is sent within certain time before a disconnection frame is really sent. A means for sending advance notice of disconnection is not limited to a beacon frame. That is, except a data frame, advance notice of disconnection may be added to a frame sent from an access point to a terminal to perform notice.

(2) It is option how a wireless LAN access point 4 mounts advance notice of disconnection that is added to a beacon frame, which is not limited to the above embodiments.

(3) Concerning a disconnection frame, the deauthentication frame defined by IEEE 802.11 is exemplified. A disconnection frame is not limited to this deauthentication frame.

(4) In the above embodiments, a wireless LAN access point or a wireless LAN terminal is exemplified as a wireless communication apparatus, and a wireless LAN terminal or a wireless LAN access point is exemplified as an opposite apparatus. Any communication apparatus may be used if only an apparatus is wirelessly connected. A communication apparatus is not limited to a wireless LAN access point and a wireless LAN terminal. The embodiment may apply to mutual wireless LAN terminals.

Technical ideas extracted from the embodiments of the present invention described above are listed as appendices pursuant to a description form of claims. The technical ideas according to the present invention can be obtained by various levels and variations from a generic concept to a more specific concept, and following appendices do not limit the present invention.

(Appendix 1) A wireless communication system in which a wireless communication apparatus sends a disconnection frame to an opposite apparatus during connection and a disconnection process is executed, the wireless communication apparatus comprising:

a processing unit that adds advance notice of disconnection, which notifies the disconnection, to a transmission frame before sending the disconnection frame for the disconnection process toward the opposite apparatus during connection, wherein after sending the advance notice of disconnection, the disconnection frame is sent to the opposite apparatus and the disconnection process is executed.

(Appendix 2) The wireless communication system of appendix 1, wherein the opposite apparatus comprises a processing unit that recognizes disconnection notice from advance notice of disconnection, the advance notice of disconnection being added to a transmission frame sent from the wireless communication apparatus before the disconnection process, and accepts a disconnection frame in stand-by time after sending the advance notice of disconnection, wherein after the stand-by time, the disconnection frame is ignored.

(Appendix 3) The wireless communication system of appendix 1, wherein the transmission frame is any one of a frame showing broadcast information representing existence of a communication apparatus, a frame representing control information of the communication apparatus and a frame set for the advance notice of disconnection.

(Appendix 4) The wireless communication system of appendix 1, wherein the advance notice of disconnection includes information representing stand-by time for accepting the disconnection frame from the opposite apparatus.

(Appendix 5) The wireless communication system of appendix 1, wherein the wireless communication apparatus includes an encryption unit that encrypts the advance notice of disconnection, and sends the encrypted advance notice of disconnection to the opposite apparatus.

(Appendix 6) The wireless communication system of appendix 2, wherein the opposite apparatus includes a decoding unit that decodes the encrypted advance notice of disconnection, and decodes the advance notice of disconnection to recognize the advance notice of disconnection.

(Appendix 7) A wireless communication apparatus sending a disconnection frame to an opposite apparatus during connection, and executing a disconnection process, the wireless communication apparatus comprising:

a processing unit that adds advance notice of disconnection, which notifies the disconnection, to a transmission frame before sending the disconnection frame for the disconnection process toward the opposite apparatus during connection, wherein after sending the advance notice of disconnection, the disconnection frame is sent to the opposite apparatus and the disconnection process is executed.

(Appendix 8) A wireless communication apparatus receiving a disconnection frame from an opposite apparatus during connection, and executing a disconnection process, the wireless communication apparatus comprising:

a receiving unit that receives a transmission frame from the opposite apparatus during connection; and a processing unit that recognizes disconnection notice from advance notice of disconnection, the advance notice of disconnection being added to a transmission frame, and executes the disconnection process based on the disconnection frame received within stand-by time after receiving the advance notice of disconnection.

(Appendix 9) The wireless communication apparatus of appendix 7 or 8, wherein
the transmission frame is any one of a frame showing broadcast information representing existence of a communication apparatus, a frame representing control information of the communication apparatus and a frame set for the advance notice of disconnection.

(Appendix 10) The wireless communication apparatus of appendix 7 or 8, wherein
the advance notice of disconnection includes information representing stand-by time for accepting the disconnection frame from the opposite apparatus.

(Appendix 11) The wireless communication apparatus of appendix 7, comprising:
an encryption unit that encrypts the advance notice of disconnection, wherein
the encrypted advance notice of disconnection is sent to the opposite apparatus.

(Appendix 12) The wireless communication apparatus of appendix 8, comprising:
a decoding unit that decodes the encrypted advance notice of disconnection, wherein
the advance notice of disconnection is decoded to be recognized.

(Appendix 13) A method for a disconnection process of a wireless communication apparatus sending a disconnection frame to an opposite apparatus during connection, and executing a disconnection process, the method comprising:
adding advance notice of disconnection, which notifies the disconnection, to a transmission frame before sending the disconnection frame for the disconnection process toward the opposite apparatus during connection; and
after sending the advance notice of disconnection, sending the disconnection frame to execute the disconnection process.

(Appendix 14) A method for a disconnection process of a wireless communication apparatus receiving a disconnection frame from an opposite apparatus during connection, and executing a disconnection process, the method comprising:
recognizing disconnection notice from advance notice of disconnection, the advance notice of disconnection being added to a transmission frame; and
executing the disconnection process based on the disconnection frame received within stand-by time after receiving the advance notice of disconnection.

(Appendix 15) The disconnection process of a wireless communication apparatus of appendix 13, comprising
encrypting the advance notice of disconnection.

(Appendix 16) The method for a disconnection process of a wireless communication apparatus of appendix 14, comprising
decoding the encrypted advance notice of disconnection.

(Appendix 17) A computer readable storage medium storing a disconnection processing program of a wireless communication apparatus that executes a disconnection process by computer by sending a disconnection frame to an opposite apparatus during connection, the program comprising the functions of:
adding advance notice of disconnection, which notifies the disconnection, to a transmission frame before sending the disconnection frame for the disconnection process toward the opposite apparatus during connection; and
after sending the advance notice of disconnection, sending the disconnection frame to execute the disconnection process.

(Appendix 18) A computer readable storage medium storing a disconnection processing program of a wireless communication apparatus that executes a disconnection process by computer by receiving a disconnection frame from an opposite apparatus during connection, the program comprising the functions of:
recognizing disconnection notice from advance notice of disconnection, the advance notice of disconnection being added to a transmission frame; and
executing the disconnection process based on the disconnection frame received within stand-by time after receiving the advance notice of disconnection.

The following effects can be obtained according to the embodiments of the invention.

(1) Advance notice of disconnection is issued before a disconnection process by a disconnection frame. Based on the disconnection frame after this advance notice of disconnection, the disconnection process is executed, and if the advance notice of disconnection is not accepted, the disconnection process is not executed. Thus, security of the disconnection process can be improved.

(2) If advance notice of disconnection is not accepted, the disconnection frame is not accepted. Thus, disconnection by an illegal disconnection frame can be prevented, and eliability of wireless connection can be enhanced.

(3) Since connection disconnection by illegal disconnection frame transmission can be prevented, communication countermeasure by the illegal disconnection frame transmission can be avoided.

The embodiments of the invention relate to disconnection of wireless connection between wireless communication apparatuses such as wireless connection between a wireless LAN access point and a wireless LAN terminal in a wireless LAN (Local Area Network) system. If advance notice of disconnection is not accepted, a disconnection process is not executed even if a disconnection frame is sent. Thus, security of communication connection and a disconnection process thereof can be improved. Therefore, the embodiments of the present invention are useful.

All examples and conditional language recited herein are intended for pedagogical purposes to aid the reader in understanding the invention and the concepts contributed by the inventor to furthering the art, and are to be construed as being without limitation to such specifically recited examples and conditions, nor does the organization of such examples in the specification relate to a showing of the superiority and inferiority of the invention. Although the embodiments of the present inventions have been described in detail, it should be understood that the various changes, substitutions, and alterations could be made hereto without departing from the spirit and scope of the invention.

What is claimed is:

1. A wireless communication system in which a wireless communication apparatus sends a disconnection frame to an opposite apparatus during connection and a disconnection process is executed, the wireless communication apparatus comprising:
a processing unit that adds advance notice of disconnection to a transmission frame and sends the transmission frame to the opposite apparatus during connection, the advance notice of disconnection being notice for notifying the disconnection in advance of sending the disconnection frame; and
an encryption unit that encrypts the advance notice of disconnection, and sends the encrypted advance notice of disconnection to the opposite apparatus;
wherein after sending the transmission frame having the advance notice of disconnection, the processing unit sends the disconnection frame to the opposite apparatus and the disconnection process is executed, the disconnection frame being a frame for the disconnection process, the opposite apparatus comprises a decoding unit that decodes the encrypted advance notice of disconnection and a processing unit that recognizes disconnection notice from the decoded advance notice of disconnection, the encrypted advance notice of disconnection being added to a transmission frame sent from the wireless communication apparatus before the disconnection process, and accepts a disconnection frame in stand-by time after sending the advance notice of disconnection, and after the stand-by time, the disconnection frame is ignored.

2. The wireless communication system of claim 1, wherein the transmission frame is any one of a frame showing broadcast information representing existence of a communication apparatus, a frame representing control information of the communication apparatus and a frame set for the advance notice of disconnection.

3. The wireless communication system of claim 1, wherein the advance notice of disconnection includes information representing stand-by time for accepting the disconnection frame from the opposite apparatus.

4. A wireless communication apparatus receiving a disconnection frame from an opposite apparatus during connection, and executing a disconnection process, the wireless communication apparatus comprising:

a receiving unit that receives, from the opposite apparatus during connection, a transmission frame, the transmission frame includes an encrypted advance notice of disconnection, and receives, from the opposite apparatus during connection, the disconnection frame, the disconnection frame being for the disconnection process; and a processing unit that decodes the encrypted advance notice of disconnection;

recognizes disconnection, in advance of receiving the disconnection frame, based on the decoded advance notice of disconnection, sets a stand-by time after receiving the advance notice of disconnection, and executes the disconnection process based on the received disconnection frame after the transmission frame is received and within the stand-by time.

5. The wireless communication apparatus of claim 4, wherein the transmission frame is any one of a frame showing broadcast information representing existence of a communication apparatus, a frame representing control information of the communication apparatus and a frame set for the advance notice of disconnection.

6. The wireless communication apparatus of claim 4, wherein the advance notice of disconnection includes information representing stand-by time for accepting the disconnection frame from the opposite apparatus.

7. A method for a disconnection process of a wireless communication apparatus receiving a disconnection frame from an opposite apparatus during connection, and executing a disconnection process, the method comprising:

receiving an encrypted advance notice of disconnection;

decoding the encrypted advance notice of disconnection;

recognizing disconnection, in advance of receiving the disconnection frame, based on the decoded advance notice of disconnection, the encrypted advance notice of disconnection being added to a transmission frame that is received from the opposite apparatus during connection;

setting a stand-by time after receiving the encrypted advance notice of disconnection, and receiving the disconnection frame after the transmission frame is received and within the stand-by time; and executing the disconnection process based on the disconnection frame received within the stand-by time.

8. A non-transitory computer readable storage medium storing a disconnection processing program of a wireless communication apparatus that executes a disconnection process by computer by receiving a disconnection frame from an opposite apparatus during connection, the program comprising:

receiving an encrypted advance notice of disconnection;

decoding the encrypted advance notice of disconnection;

recognizing disconnection, in advance of receiving the disconnection frame, based on the decoded advance notice of disconnection, the encrypted advance notice of disconnection being added to a transmission frame that is received from the opposite apparatus during connection;

setting a stand-by time after receiving the encrypted advance notice of disconnection, and receiving a disconnection frame after the transmission frame is received and within the stand-by time; and executing the disconnection process based on the disconnection frame received within the stand-by time.

* * * * *